United States Patent
Otsuka (10) Patent No.: US 6,931,000 B2
(45) Date of Patent: Aug. 16, 2005

(54) INTERNAL LINE CONTROL SYSTEM

(75) Inventor: Kiyokazu Otsuka, Tokyo (JP)

(73) Assignee: NEC Corporation, Tokyo (JP)

( * ) Notice: Subject to any disclaimer, the term of this patent is extended or adjusted under 35 U.S.C. 154(b) by 904 days.

(21) Appl. No.: 09/731,698

(22) Filed: Dec. 8, 2000

(65) Prior Publication Data

US 2001/0015969 A1 Aug. 23, 2001

(30) Foreign Application Priority Data

Dec. 9, 1999 (JP) .......................................... 11-350092

(51) Int. Cl.[7] .......................... H04L 12/66; H04M 7/00
(52) U.S. Cl. ....................... 370/352; 370/356; 370/401; 379/88.17; 379/93.07; 379/220.01
(58) Field of Search ............................... 370/352, 353, 370/354, 356, 357, 358, 389, 401, 465, 466, 467; 379/88.17, 88.22, 88.27, 93.01, 93.07, 219, 220.01, 221.08, 265.01, 265.09, 268, 269; 709/203, 230, 238, 249

(56) References Cited

U.S. PATENT DOCUMENTS

| | | |
|---|---|---|
| 5,629,687 A | 5/1997 | Sutton et al. |
| 5,675,733 A | 10/1997 | Williams |
| 5,892,764 A | 4/1999 | Riemann et al. |
| 5,999,609 A | 12/1999 | Nishimura |
| 6,118,864 A * | 9/2000 | Chang et al. ................ 379/225 |
| 6,377,570 B1 * | 4/2002 | Vaziri et al. ................ 370/352 |
| 6,674,745 B1 * | 1/2004 | Schuster et al. ............ 370/352 |
| 6,721,790 B1 * | 4/2004 | Chen .......................... 709/220 |

* cited by examiner

Primary Examiner—Alpus H. Hsu
(74) Attorney, Agent, or Firm—Young & Thompson (57) ABSTRACT

In an internal line control system, a telephone having an Internet protocol (IP) and capable of being connected to the Internet through the communication mode, includes a device for storing an IP address of a private branch exchange, and a device for sending a switching request to the IP address of the private branch exchange while specifying identification information. Concurrently, a private branch exchange having an Internet protocol (IP) and connected to the Internet through the communication mode, includes a device for storing a correlation between the IP address of the telephone and an internal line number depending upon the identification information, and a device for transmitting, depending upon the correlation between the IP address and the internal line number, a control signal and a speech communication signal for an internal line telephone of the internal line number to an address specified by the IP address. This allows a control to be switched over to the internal line telephone connected to the Internet so as to inherit various types of settings for the internal line telephone directly accommodated in the private branch exchange.

15 Claims, 8 Drawing Sheets

23 INTERNAL LINE IDENTIFICATION INFORMATION

FIG. 3

24 IP ADDRESS/INTERNAL LINE CORRESPONDENCE DATA

FIG. 4

25 CURRENT INTERNAL LINE SERVICE CONDITION DATA

INTERNAL LINE CONTROL SYSTEM

BACKGROUND OF THE INVENTION

The present invention relates to an internal line control system in a private branch exchange. More particular, the invention relates to an internal line control system in which a telephone connected to the Internet can be used as a substitute for an internal line accommodated in the private branch exchange.

Description of the Prior Art

In the prior-art private branch exchange system, audio communication is realized by an internal telephone accommodated at a physically predetermined position. Further, when the telephone connected to the Internet or LAN is registered as an internal line of a private branch exchange, a unique internal line number is recorded and used as the internal line in the private branch exchange.

Accordingly, when the telephone is connected as the internal telephone to the Internet, it is necessary to record the unique internal line number as the internal line in the private branch exchange as described above. Hence, it is impossible to use the telephone as a substitute for an internal line of the private branch exchange which has been in use.

In the prior-art system described above, there are problems in that, when the telephone is connected to the Internet as the internal telephone, it is impossible to use the telephone as a substitute for the internal line of the private branch exchange which has been in use, and inherit and employ each setting of services which have been set in the internal line of the private branch exchange.

SUMMARY OF THE INVENTION

In view of the foregoing problems, it is an object of the present invention to provide an internal line control system in which a control can be switched over to an internal telephone connected to the Internet so as to inherit various types of settings of an internal line telephone directly accommodated in a private branch exchange, and the control can be switched over from the internal line in the own office and the internal line can be used as a substitutive internal line in any place so long as the telephone can be connected to the Internet.

According to the present invention, for achieving the above-mentioned objects, there is provided an internal line control system in which a telephone having an Internet protocol (IP) and capable of being connected to the Internet through the communication mode includes means for storage of an IP address of a private branch exchange, and means for sending a switching request to the IP address of the private branch exchange while specifying identification information of an internal line of which switching is requested, accommodated in the private branch exchange, and a private branch exchange having an Internet protocol (IP) and connected to the Internet through the communication mode includes means for storage of a correlation between the IP address of the telephone and an internal line number depending upon the identification information, and means for transmitting, depending upon the correlation between the IP address and the internal line number, a control signal and a speech communication signal for an internal line telephone of the internal line number to an address specified by the IP address.

In accordance with second aspect of the present invention, there is provided an internal line control system in which an internal line telephone corresponding to the internal line number includes posting means for posting a message in that a control is switched over to the telephone on the Internet, and the private branch exchange posts the switching by the posting means of the internal line telephone at a time of switching to the telephone on the Internet.

Another aspect of the present invention, there is provided an internal line control system in which a computer having the function of transmitting/receiving sound is used as a substitute for the telephone on the Internet.

Another aspect of the present invention, there is provided the internal line control system described above, in which the private branch exchange includes means for receiving authentication information transmitted with the switching request from the telephone connected to the Internet, and authenticating whether or not the switching request is acceptable depending upon the identification information.

Another aspect of the present invention, there is provided the internal line control system in which an own IP address of the telephone is stored in a server on the Internet instead of the telephone, and the telephone obtains the own IP address from the server when presenting the switching request.

Another aspect of the present invention, there is provided the internal line control system further including encrypting means for encrypting a control signal and a speech communication signal exchanged between the private branch exchange and the telephone, and decrypting means for decrypting the encrypted control signal and speech communication signal.

Another aspect of the present invention, there is provided the internal line control system further including the plurality of private branch exchanges accommodating the internal line telephone, in which the telephone on the Internet includes means for specifying identification information of the internal telephone accommodated in the plurality of private branch exchanges, and requesting switching of the appropriate private branch exchange.

Another aspect of the present invention, there is provided the internal line control system further including the plurality of private branch exchanges accommodating the internal line telephone, and the plurality of telephones on the Internet. In the internal line control system, the telephone on the Internet includes means for specifying identification information of the internal line telephone accommodated in the plurality of private branch exchanges, and requesting switching of the appropriate private branch exchange.

Another aspect of the present invention, there is provided the internal line control system further including the plurality of private branch exchanges accommodating the internal line telephone. In the internal line control system, IP addresses of the plurality of private branch exchanges are stored in a server on the Internet, and the telephone obtains from the server the IP address of the private branch exchange when requesting switching.

Another aspect of the present invention, there is provided the internal line control system in which the private branch exchange accepting the switching request from the telephone includes means for posting, when the internal line telephone is in use, a message to this effect to the telephone requesting the switching.

DESCRIPTION OF THE PREFERRED EMBODIMENTS

A detailed description will now be given of the present invention referring to the accompanying drawings.

First Embodiment

Figure 1:
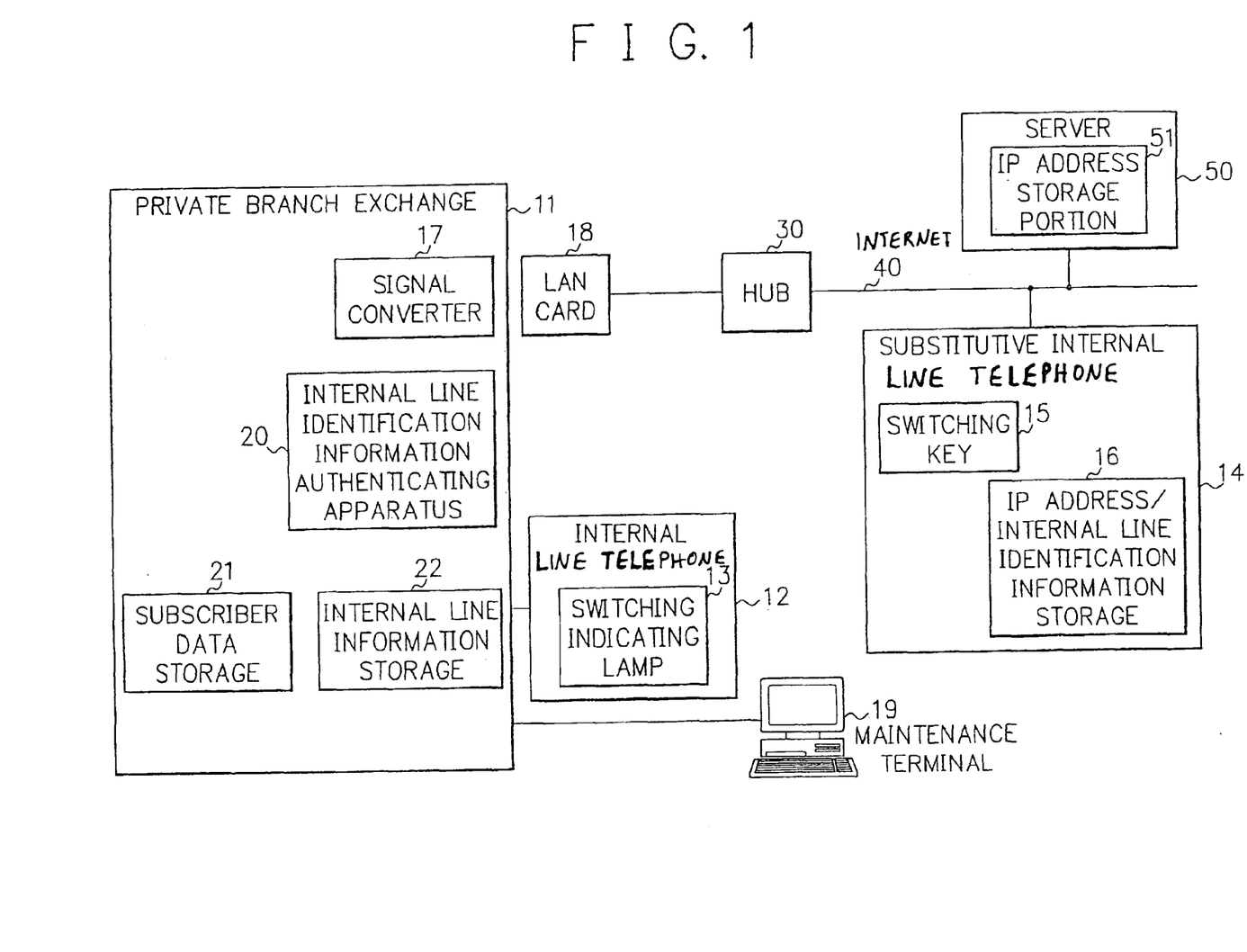
FIG. 1 is a block diagram showing a system configuration according to the first embodiment of the present invention.

FIG. 1 is a block diagram showing a configuration of an internal line control system according to the first embodiment of the present invention.

Referring to FIG. 1, in the internal line control system according to the first embodiment, a private branch exchange 11 is connected through a LAN card 18 to a substitutive internal line telephone 14 and a server 50 over the Internet, and the private branch exchange 11 is connected to an internal line telephone 12 and a maintenance terminal 19.

The private branch exchange 11 is connected to an Internet 40 through the LAN card 18 and a hub 30, and the Internet 40 is connected to the substitutive internal line telephone 14 and the server 50.

In the embodiment, the private branch exchange 11 includes a signal converter 17, an internal line identification information authenticating apparatus 20, a subscriber data storage 21, and an internal line information storage 22.

Figure 2:
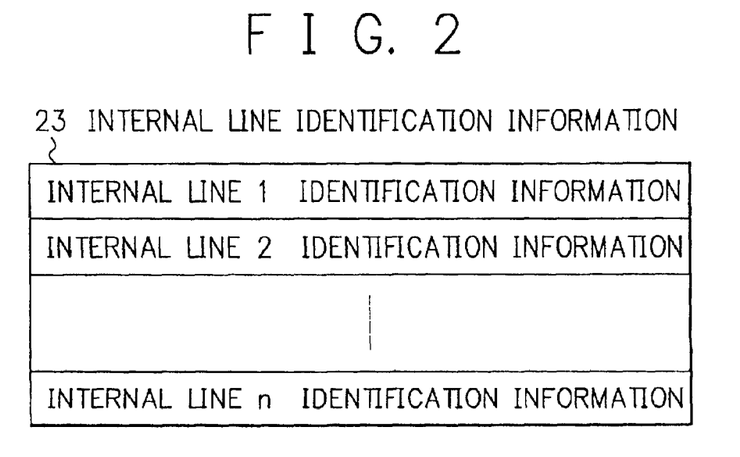
FIG. 2 is a diagram showing an illustrative structure of internal line identification information in the first embodiment of the present invention.

An internal line identification information 23 as shown in FIG. 2 is recorded in the subscriber data storage 21. The internal line identification information 23 is recorded in a subscriber data storage 21 and contains information for each of internal line numbers (internal line 1, . . . , internal line n), and is recorded as authentication information (such as ID or password) used for authentication of a switching request from the substitutive internal line telephone 14. The authentication using the internal line identification information 23 prevents unauthorized access. The internal line identification information 23 is recorded in the subscriber data storage 21 through the operation of the maintenance terminal 19.

When the internal line identification information is sent with the internal line switching request from the substitutive internal telephone 14, the internal line identification information authenticating apparatus 20 authenticates whether or not the sent internal line identification information is recorded in the internal line identification information 23 in the subscriber data storage 21.

Figure 3:
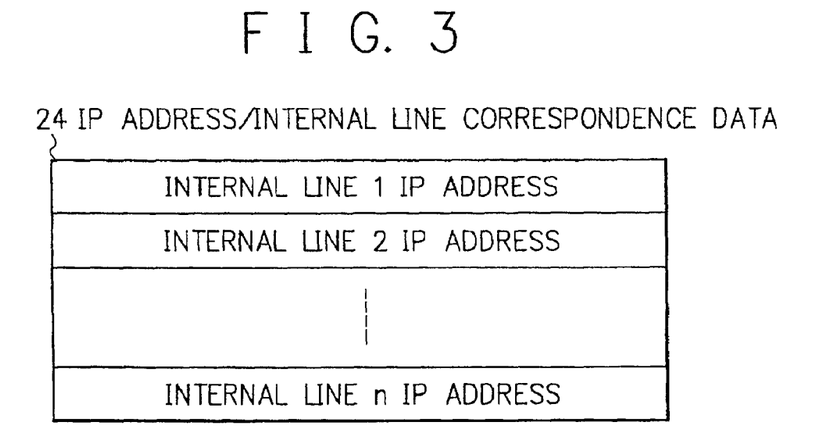
FIG. 3 is a diagram for explaining an illustrative structure of IP address/internal line correspondence data.
Figure 4:
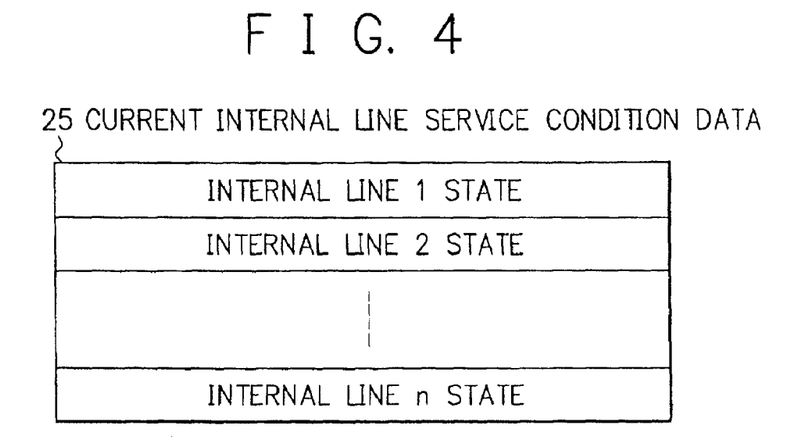
FIG. 4 is a diagram showing an illustrative structure of current internal line service condition data in the first embodiment of the present invention.

As shown in FIG. 4, in the internal line information storage 22 is recorded, for each of the internal line numbers, current internal line service condition data 25 showing whether or not the internal telephone line 12 is now in use or the substitutive internal line telephone 14 is in use as a substitute for the internal line telephone 12. The current internal line service condition data 25 is updated every time the internal line is switched over between the internal line telephone 12 and the substitutive internal line telephone 14. Further, in the internal line information storage 22 is recorded IP address/internal line correspondence data 24 as shown in FIG. 3. When the internal line is switched over to the substitutive internal line telephone 14 according to the switching request, in the IP address/internal line correspondence data 24 is recorded an IP address of the substitutive internal telephone line 14 corresponding to the internal line number. Therefter, when the internal line is switched back to the internal line telephone 12, the IP address/internal line correspondence data 24 is erased.

The substitutive internal line telephone 14 connected to the Internet 40 includes a switching key 15 and an IP address/internal line identification information storage 16.

The switching key 15 is used to transmit the internal line switching request when the substitutive internal line telephone 14 is used as a substitute for the internal line telephone 12. Though a separate key can be mounted as the switching key 15 to the substitutive internal telephone line 14, the function of the switching key 15 may be provided by, for example, combining keys previously attached to the substitutive internal telephone line 14.

The server 50 includes an IP address storage portion 51, and an IP address of the substitutive internal line telephone 14 is stored in the IP address storage portion 51. When presenting a switching request, the substitutive internal line telephone 14 reads an own IP address from the IP address storage portion 51 of the server 50 and transmits the IP address.

In the IP address/internal line identification information storage 16 is stored data correlating the IP address with the internal line identification information.

In addition, the substitutive internal line telephone 14 includes unillustrated means for transmitting and receiving a control signal and a speech communication signal between the substitutive internal line telephone 14 and the private branch exchange 11 after the private branch exchange 11 accepts a connection request.

Further, the internal line telephone 12 includes a switching indicating lamp 13 indicating that the internal line is switched over to the substitutive internal line telephone 14.

Figure 5:
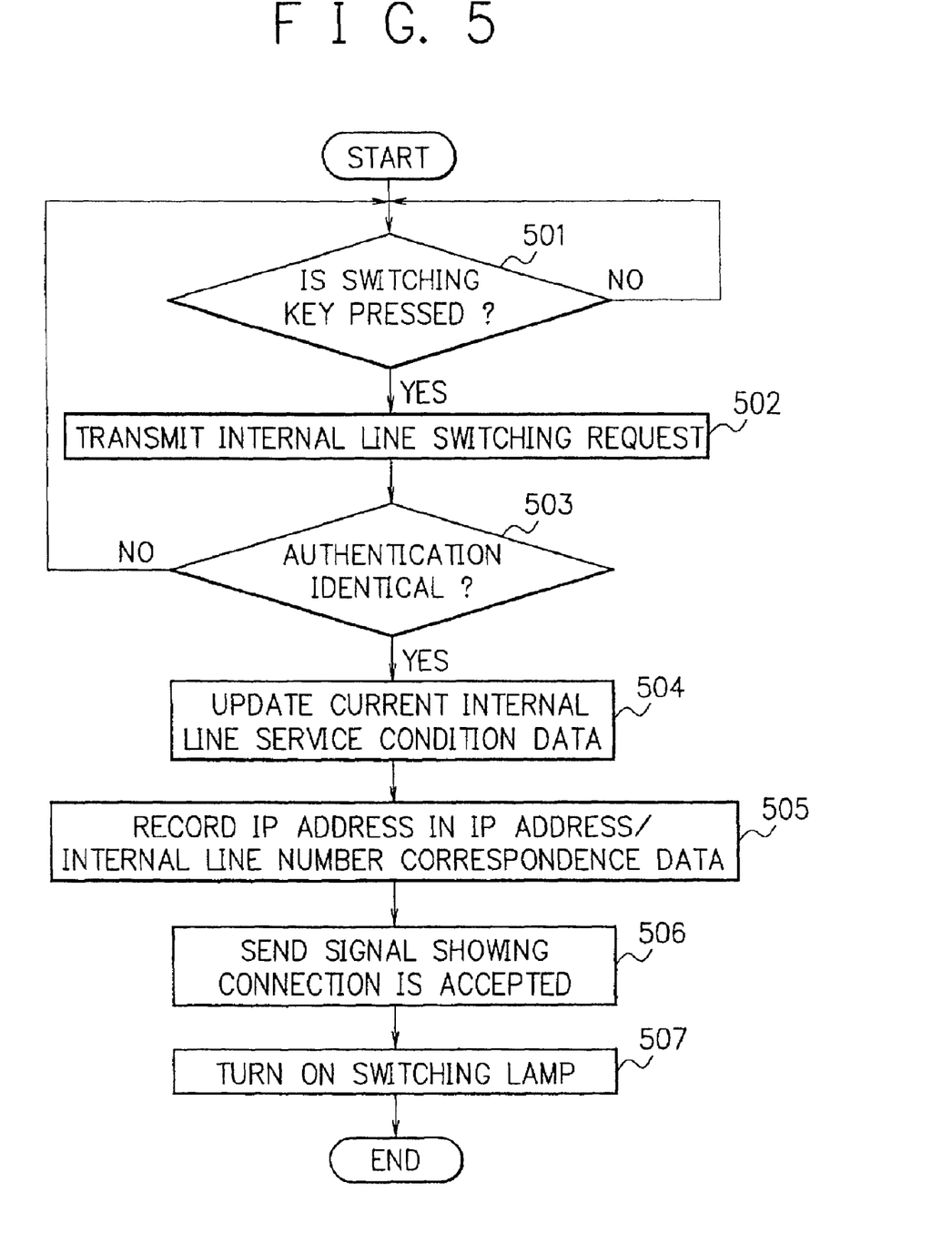
FIG. 5 is a flowchart for explaining the operation of an internal line control system in the first embodiment of the present invention.

A description will now be given of the operation of the internal line control system having the above configuration referring to the flowchart shown in FIG. 5.

In advance, by using the maintenance terminal 19 connected to the private branch exchange 11, the internal line identification information 23 as shown in FIG. 2 is recorded in the subscriber data storage 21 in the private branch exchange 11 as authentication information for identification of the internal line.

After the substitutive internal line telephone 14 is connected to the Internet, the switching key 15 is pressed (Step 501) to transmit, to the IP address of the private branch exchange 11 stored in the IP address/internal line identification information storage 16, an internal line switching request containing both the own IP address obtained from the IP address storage portion 51 of the server 50 and the internal line identification information stored in the IP address/internal line identification information storage 16 (Step 502).

In response to the internal line switching request from the substitutive internal line telephone 14, the internal line identification information authenticating apparatus 20 in the private branch exchange 11 authenticates the received internal line identification information with reference to the internal line identification information 23 in the subscriber data storage 21 (Step 503).

When both internal line identification information are identical and the request is authorized, the current internal line service condition data 25 in the internal line information storage 22 is updated to show that the substitutive internal line telephone 14 is now in use (Step 504). Subsequently, in the IP address/internal line correspondence data 24 of the internal line information storage 22 is stored an IP address corresponding to an internal line number identical with that of the received internal line identification information (Step 505).

Further, the private branch exchange 11 transmits to the substitutive internal line telephone 14 a signal showing that the internal line switching request is accepted (Step 506), and turn on the switching indicating lamp 13 of the internal line telephone 12 (Step 507), thereby posting a message in that the internal line is switched over from the internal line telephone 12 to the substitutive internal line telephone 14.

Thereafter, when a control is requested for the internal line number for which the switching request is accepted in the private branch exchange 11, the private branch exchange 11 recognizes, with reference to the current internal line service condition data 25, that the substitutive internal line telephone 14 is now in use as a substitute for the internal line 12. The private branch exchange 11 assembles the control signal and the speech communication signal into an IP packet in the signal converter 17, and sends the IP packet to the substitutive internal line telephone 14 through the LAN card 18 and over the Internet 40.

The substitutive internal line telephone 14 is operated in response to the control signal from the private branch exchange 11 to transmit user's voice by using a sound signal.

Further, by pressing the switching key 15, the substitutive internal line telephone 14 sends an internal line switching-back request to the private branch exchange 11, and the private branch exchange 11 enables the internal line to be switched over from the substitutive internal line telephone 14 to the internal line telephone 12. At the same time, the current internal line service condition data 25 is updated to show that the internal line telephone 12 is now in use, the IP address/internal line correspondence data 24 is erased, and the switching indicating lamp 13 of the internal line telephone 12 is turned off. Thereafter, the control signal and the speech communication signal are exchanged between the private branch exchange 11 and the internal line 12.

According to the first embodiment, the internal line control system is operated as set forth above. Thus, the telephone substitutive internal line telephone 14 can be used as a substitute for the internal line telephone 12 in the own office in any place so long as the telephone can be connected to the Internet.

Alternatively, in the above embodiment, the private branch exchange 11 may be provided with means for posting, if the internal line telephone 12 is in use when presenting the switching request by pressing the switching key 15 of the substitutive internal line telephone 14, an in-use message to the substitutive internal line telephone 14. Concurrently, the substitutive internal line telephone 14 may be provided with means for indicating the in-use message by, for example, turning on the lamp, or outputting the message depending upon the posting from the private branch exchange 11.

Second Embodiment

Figure 6:
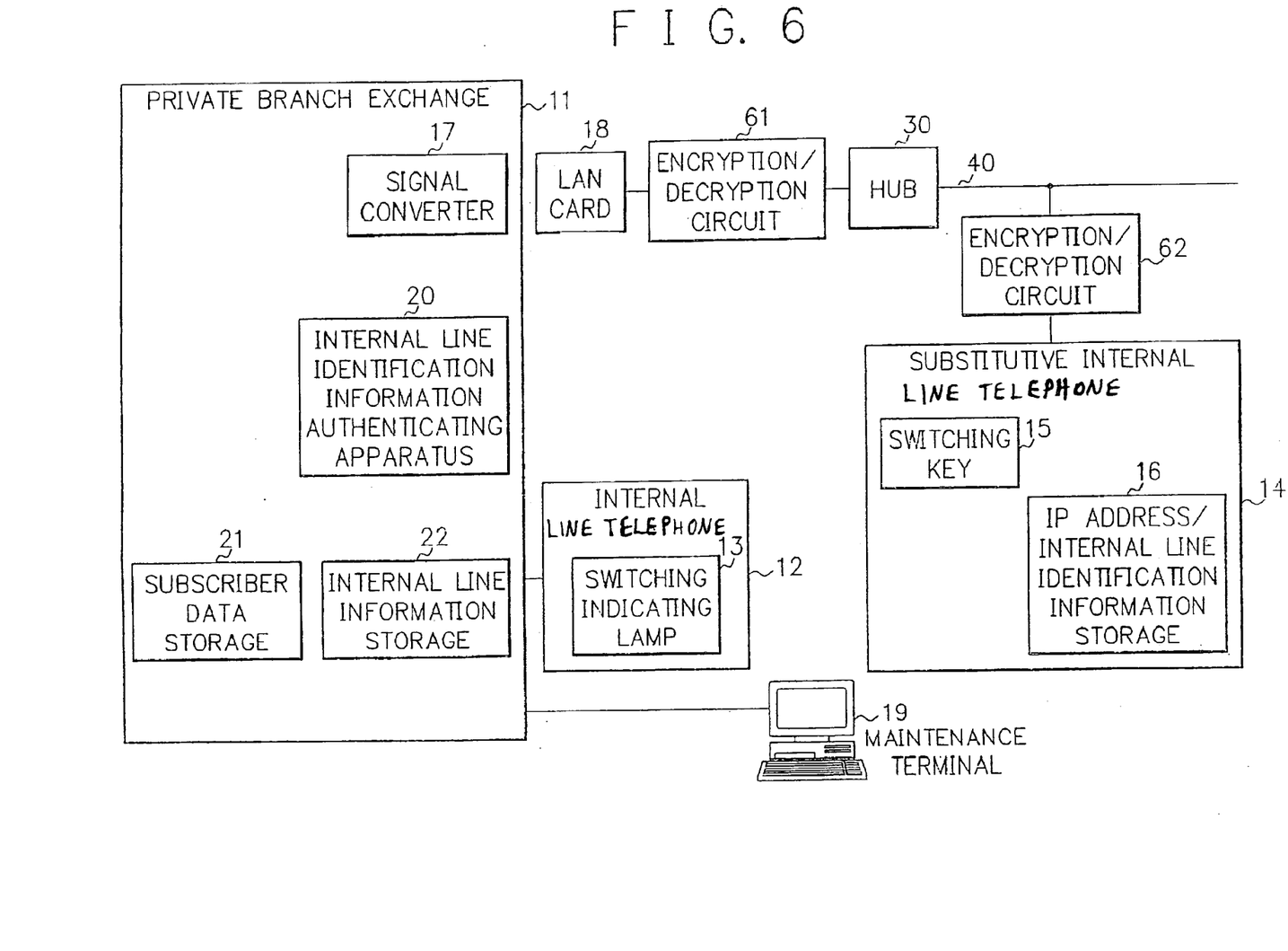
FIG. 6 is a block diagram showing a system configuration according to the second embodiment of the present invention.

A description will now be given of an internal line control system according to the second embodiment of the present invention. FIG. 6 is a block diagram showing a configuration of the internal line control system according to the second embodiment of the present invention.

Referring to FIG. 6, in the internal line control system according to the second embodiment, encryption/decryption circuits 61, 62 are mounted to encrypt and decrypt a control signal and a speech communication signal exchanged between a private branch exchange 11 and a substitutive internal line telephone 14. The same reference numerals are used for component parts identical with those in the first embodiment of FIG. 1, and descriptions thereof are omitted.

In the embodiment, the control signal and the sound signal are transmitted between the private branch exchange 11 and the substitutive internal line telephone 14 through encryption by the encryption/decryption circuits 61, 62, thereby preventing the control signal and the sound signal from leaking out over the Internet 40. In the encryption/decryption circuits 61 and 62, it is possible to employ one of cryptosystems (such as symmetrical key cryptosystem, and asymmetrical key cryptosystem) in the prior art.

Third Embodiment

Figure 7:
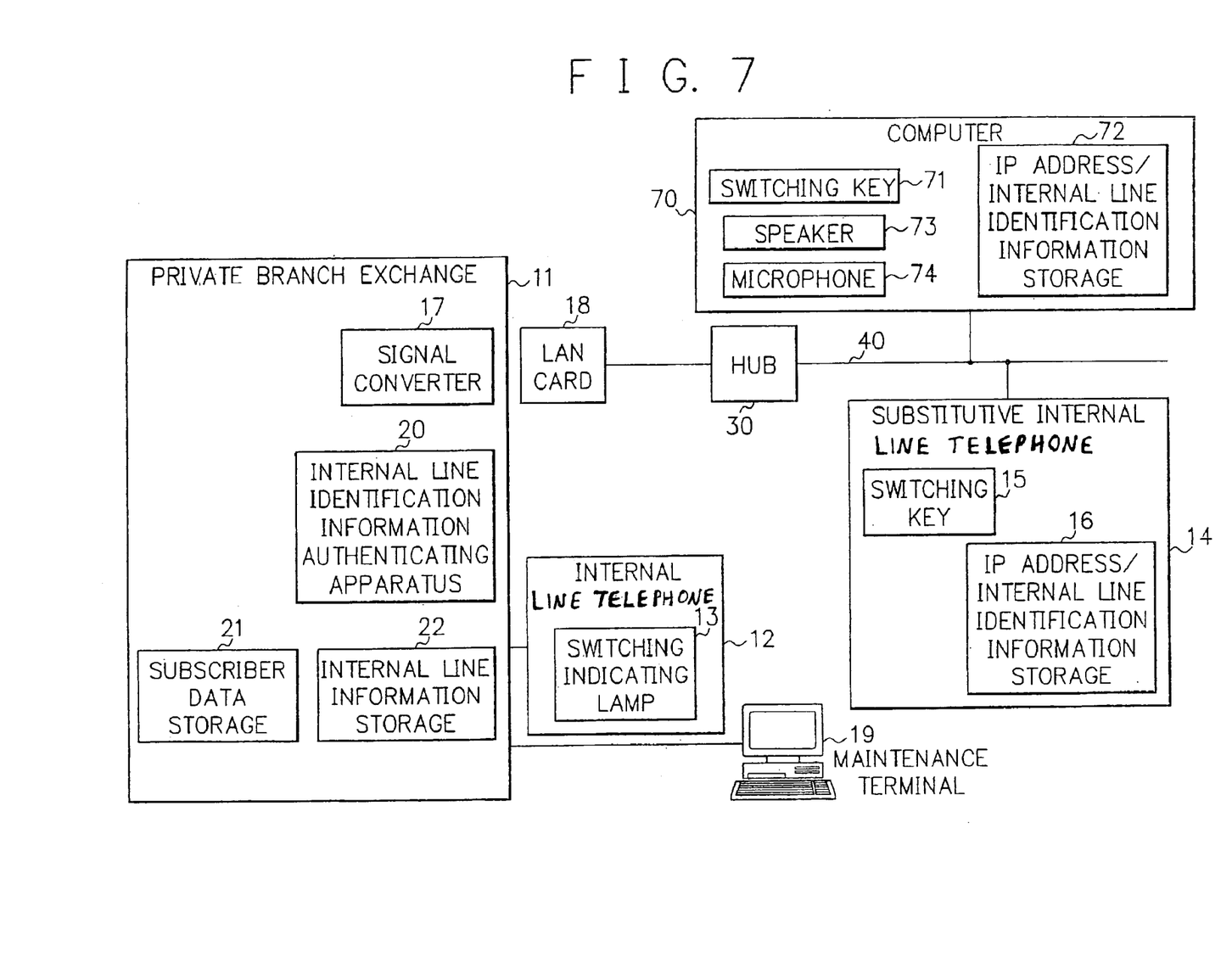
FIG. 7 is a block diagram showing a system configuration according to the third embodiment of the present invention.

A description will now be given of an internal line control system according to the third embodiment of the present invention. FIG. 7 is a block diagram showing a configuration of the internal line control system according to the third embodiment of the present invention.

Referring to FIG. 7, in the internal line control system according to the third embodiment, a computer 70, as well as a substitutive internal line telephone 14, can be used instead of an internal line telephone 12. The same reference numerals are used for component parts identical with those in the first embodiment of FIG. 1, and descriptions thereof are omitted.

The computer 70 including a personal computer (PC) and a mobile PC, is connected to the Internet 40, and can be used for speech communication as a substitute for the internal line telephone 12. Hence, as in the substitutive internal line telephone 14, the computer 70 is provided with a switching key 71, an IP address/internal line identification information storage 72, and a speaker 73 and a microphone 74 for exchange of sound (speech communication)

In the embodiment, as in the above-mentioned first embodiment, speech communication can be realized by switching over from the internal line telephone 12 to the computer 70. The operation is identical with that in the first embodiment shown in FIG. 5.

Fourth Embodiment

Figure 8:
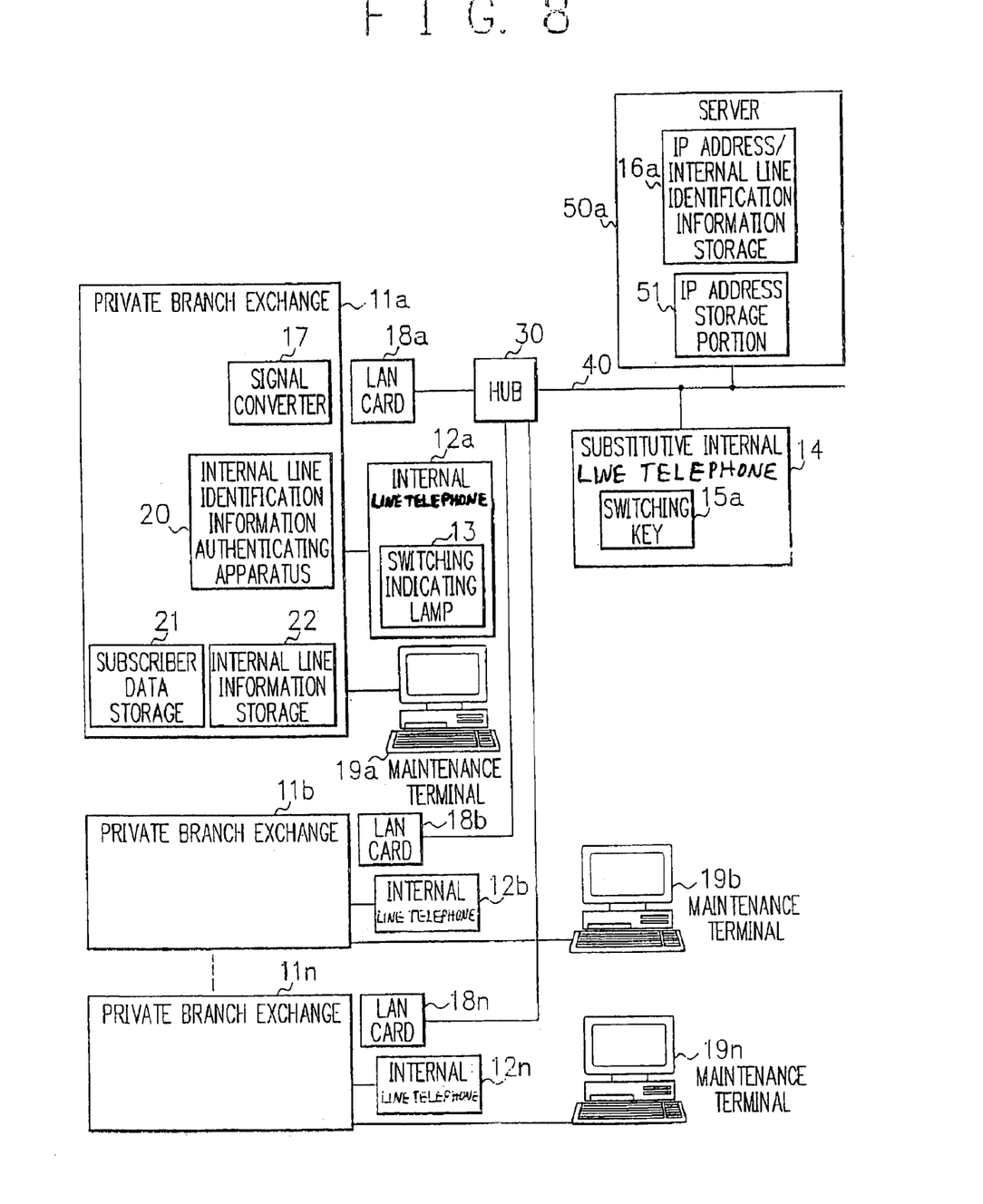
FIG. 8 is a block diagram showing a system configuration according to the fourth embodiment of the present invention.

A description will now be given of an internal line control system according to the fourth embodiment of the present invention. FIG. 8 is a block diagram showing a configuration of the internal line control system according to the fourth embodiment of the present invention.

Referring to FIG. 8, in the internal line control system according to the fourth embodiment, a plurality of private branch exchanges 11a, 11b, . . . , 11n are interconnected through a hub 30. As shown in FIG. 8, the private branch exchanges 11a, 11b, . . . , 11n are connected to the Internet 40 through LAN cards 18a to 18n, and respectively accommodate internal line telephones 12a to 12n. Each private branch exchange includes a signal converter 17, an internal line identification information authenticating apparatus 20, a subscriber data storage 21, and an internal line information storage 22.

Further, instead of the IP address/internal line identification information storage 16 mounted in the substitutive internal line telephone 14 in the first embodiment, a server 50a includes an IP address/internal line identification information storage 16a. In the IP address/internal line identification information storage 16a are stored IP address and internal line identification information for each of the private branch exchanges 11a, 11b, ..., 11n. The same reference numerals are used for component parts identical with those in the first embodiment of FIG. 1, and descriptions thereof are omitted.

In the embodiment, when switching of the internal line is requested from the substitutive internal line telephone 14, the substitutive internal line telephone 14 obtains from the IP address/internal line identification information storage 16a of the server 50a the IP address and the internal line identification information of one of the private branch exchanges 11a, 11b, ..., 11n, upon which the internal line switching request should be made, and transmits the results to the appropriate private branch exchange.

Further, the substitutive internal line telephone 14 includes the switching key 15a for selective switching of the internal line telephones 12a to 12n accommodated in the plurality of private branch exchanges 11a, 11b, ..., 11n.

Figure 9:
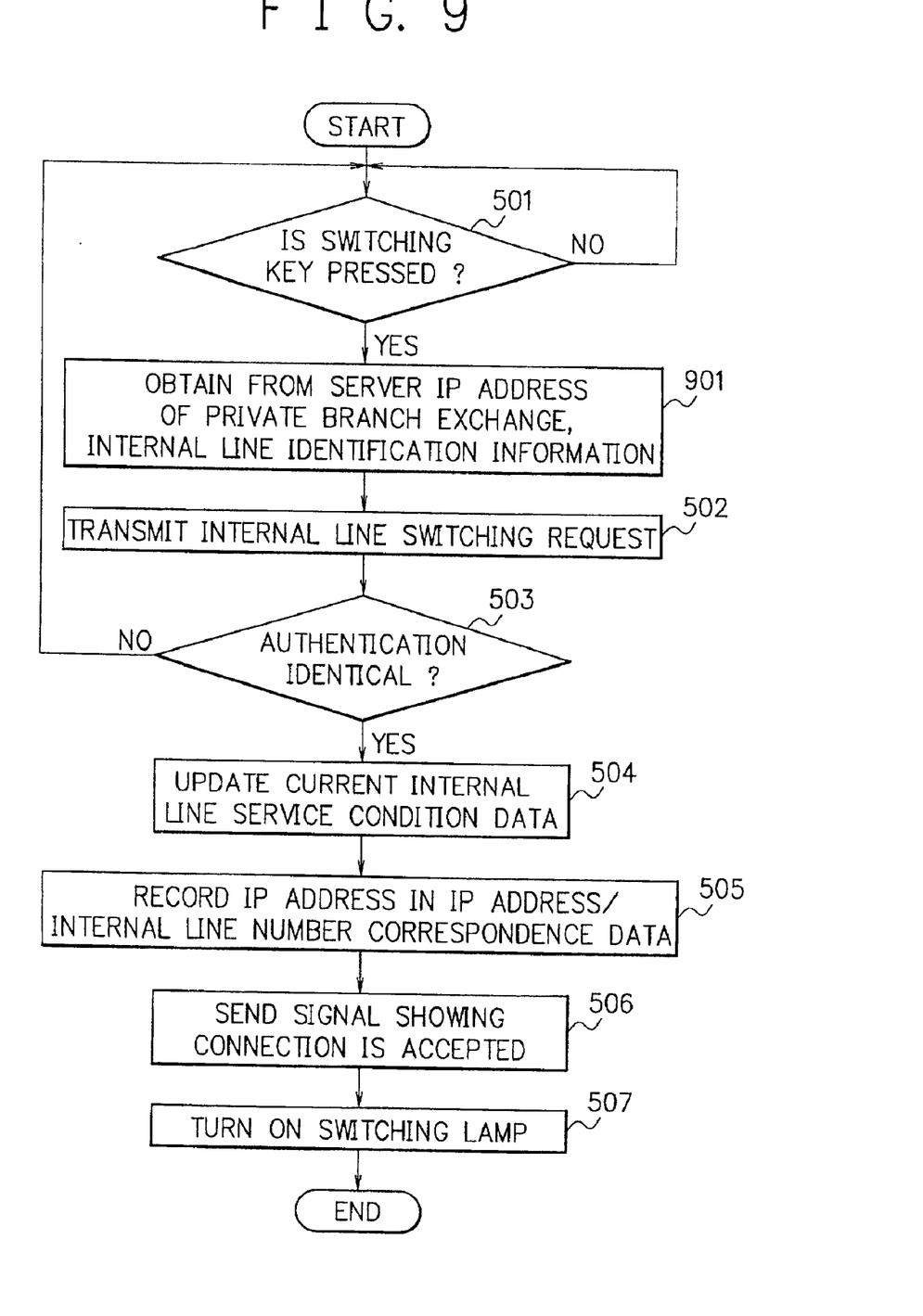
FIG. 9 is a flowchart for explaining the operation of an internal line control system in the fourth embodiment of the present invention.

A description will now be given of the operation of the internal line control system according to the fourth embodiment with reference to the flowchart of FIG. 9.

In advance, by using maintenance terminals 19a, 19b, ..., 19n connected to the private branch exchanges 11a, 11b, ..., 11n, internal line identification information 23 as shown in FIG. 2 is recorded, as authentication information for identification of the internal line, in the subscriber data storage 21 in each of private branch exchanges 11a, 11b, ..., 11n.

After the substitutive internal line telephone 14 is connected to the Internet, the switching key 15a is pressed corresponding to any one of the internal line telephones 12a to 12n, to which the control should be switched over (Step 501). Subsequently, the substitutive internal line telephone 14 obtain from the IP address/internal line identification information storage 16a of the server 50 the IP address of one of the private branch exchanges 11a, 11b, ..., 11n accommodating one of the internal line telephones 12 to 12n, to which the control should be switched over (Step 901), and transmits to the obtained IP address of one of the private branch exchanges 11, 11b, ... 11n an internal line switching request containing an own IP address obtained from an IP address storage portion 51 of the server 50a and internal line identification information stored in the IP address/internal line identification infraction storage 16a of the server 50a (Step 502) .

In later steps, the same operation is carried out as in the discussion with reference to FIG. 5.

Fifth Embodiment

Figure 10:
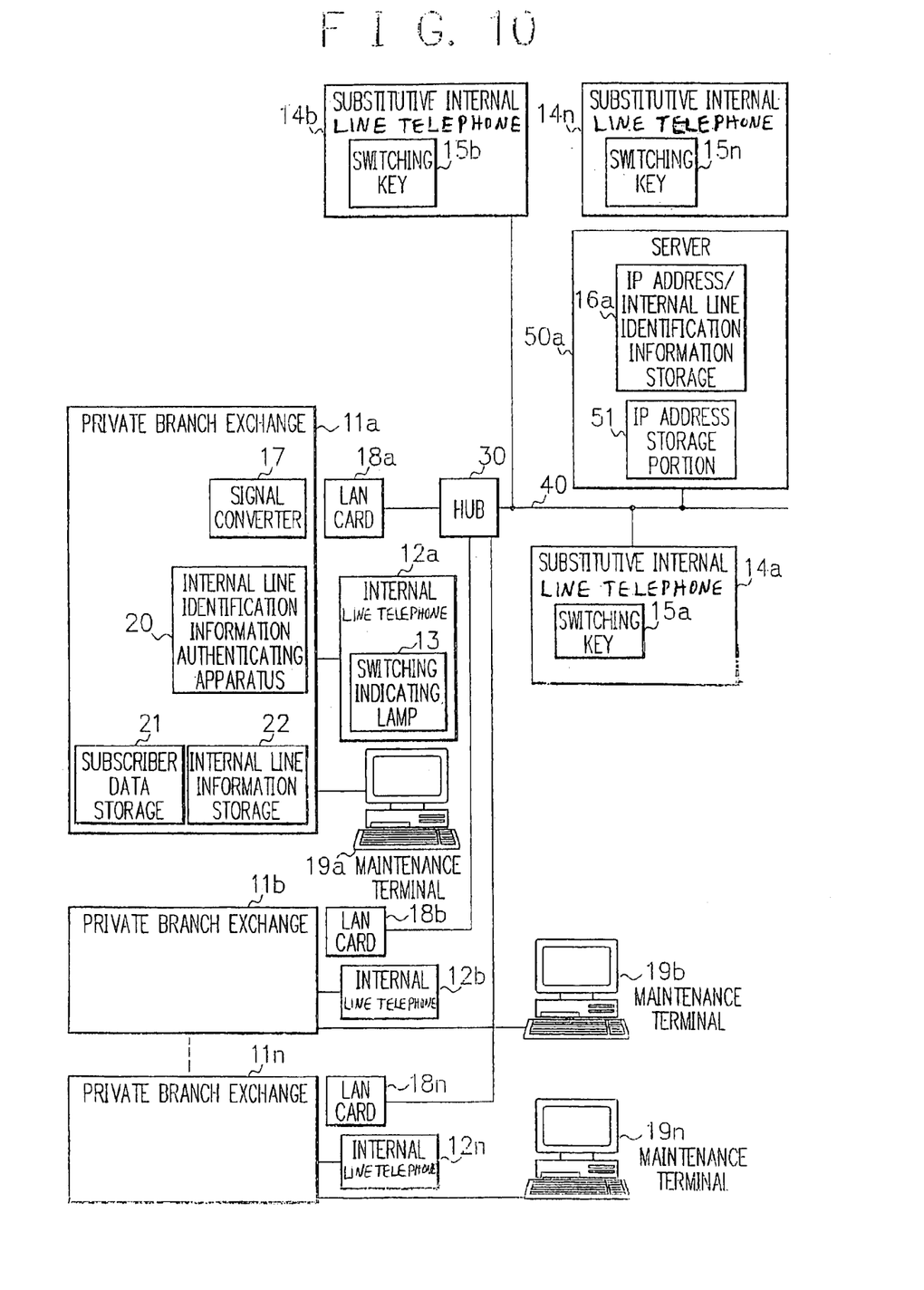
FIG. 10 is a block diagram showing a system configuration according to the fifth embodiment of the present invention.

A description will now be given of an internal line control system according to the fifth embodiment of the present invention. FIG. 10 is a block diagram showing a configuration of the internal line control system according to the fifth embodiment of the present invention.

Referring to FIG. 10, in the internal line control system according to the fifth embodiment, a plurality of private branch exchanges 11a, 11b, ..., 11n are interconnected through a hub 30, and a plurality of substitutive internal line telephones 14a, 14b, ..., 14n are interconnected over an Internet 40. As shown in FIG. 10, the private branch exchanges 11a, 11b, ..., 11n are connected to the Internet 40 through LAN cards 18a to 18n, and respectively accommodate internal line telephones 12a to 12n. Each private branch exchange includes a signal converter 17, an internal line identification information authenticating apparatus 20, a subscriber data storage 21, and an internal line information storage 22.

Further, instead of the IP address/internal line identification information storage 16 mounted in the substitutive internal line telephone 14 in the first embodiment, a server 50a includes an IP address/internal line identification information storage 16a. In the IP address/internal line identification information storage 16a are stored IP address and internal line identification information for each of the private branch exchanges 11a, 11b, ..., 11n. The same reference numerals are used for component parts identical with those in the first embodiment of FIG. 1, and descriptions thereof are omitted.

In the embodiment, when switching of an internal line is requested from the substitutive internal line telephones 14a to 14n, the substitutive internal line telephone obtains from the IP address/internal line identification information storage 16a of the server 50a the IP address and the internal line identification information of one of the private branch exchanges 11a, 11b, ..., 11n, of which switching is requested, and transmits the results to the appropriate private branch exchange.

Further, the substitutive internal line telephones 14a to 14n include the switching keys 15a to 15n for selective switching of the internal line telephones 12a to 12n accommodated in the plurality of private branch exchanges 11a, 11b, ..., 11n.

In the embodiment, the operation of the internal line control system is identical with that in the fourth embodiment. However, in the fifth embodiment, since the switching may be requested from the plurality of substitutive internal line telephones 14a to 14n, the private branch exchange 11 may be provided with means for posting to the substitutive internal line telephone 14 a message in that the internal line telephone of which switching is requested is in use, or one internal line telephone is used as a substitute for another substitutive internal line telephone. Concurrently, the substitutive internal line telephone 14 may be provided with means for indicating the situation depending upon the posting from the private branch exchange 11 by, for example, turning on a lamp, or outputting the message.

As set forth above, according to the present invention, it is possible to provide an effect in that the control can be switched over by the internal line telephone accommodated in the private branch exchange to use the telephone connected over the Internet, and the telephone can be used as a substitute for the internal line in the own office in any place so long as the telephone can be connected to the Internet.

In addition, by mounting the encrypting means for encrypting the control signal and the speech communication signal exchanged between the private branch exchange and the telephone, and the decrypting means for decrypting the encrypted control signal and speech communication signal, it is possible to prevent the control signal and the sound signal from leaking out over the Internet.

While preferred embodiments of the invention have been described using specific terms, such description is for illustrative purposes only, and it is to be understood that changes and variations may be made without departing from the spirit or scope of the following claims.

What is claimed is:

1. An internal line control system, wherein a first telephone supporting an Internet protocol (IP) and capable of being connected to the Internet through a communication mode, comprising: a storage means for storing an IP address of a private branch exchange; and a sending means for sending a switching request to the IP address of the private branch exchange while specifying identification information of an internal line telephone of which switching is requested, accommodated in the private branch exchange; and said private branch exchange supporting an Internet protocol (IP) and connected to the Internet through the communication mode, comprising: a storage means for storing a correlation between the IP address of the first telephone and an internal line number depending upon the identification information; and a transmitting means for transmitting, depending upon the correlation between the IP address and the internal line number, a control signal and a speech communication signal for the internal line telephone to an address specified by the IP address.

2. The internal line control system according to claim 1, wherein a computer having the function of transmitting/receiving sound is used as a substitute for the first telephone.

3. The internal line control system according to claim 1, wherein the private branch exchange accepting the switching request from the first telephone includes means for posting, when the internal line telephone is in use, a message to this effect to the first telephone requesting the switching.

4. The internal line control system according to claim 1, wherein an own IP address of the first telephone is stored in a server on the Internet instead of the first telephone, and the first telephone obtains the own IP address from the server when presenting the switching request.

5. An internal line control system, wherein a first telephone supporting an Internet protocol (IP) and capable of being connected to the Internet through a communication mode, comprising: a storage means for storing an IP address of a private branch exchange; and a sending means for sending a switching request to the IP address of the private branch exchange while specifying identification information of an internal line telephone of which switching is requested, accommodated in the private branch exchange;

said private branch exchange supporting an Internet protocol (IP) and connected to the Internet through the communication mode, comprising: a storage means for storing a correlation between the IP address of the first telephone and an internal line number depending upon the identification information; and a transmitting means for transmitting, depending upon the correlation between the IP address and the internal line number, a control signal and a speech communication signal for the internal line telephone to an address specified by the IP address; and said internal line telephone includes posting means for posting a message in that a control is switched over to the first telephone, and the private branch exchange posts the switching by the posting means of the internal line telephone at a time of switching to the first telephone.

6. The internal line control system according to claim 5, wherein a computer having the function of transmitting/receiving sound is used as a substitute for the first telephone.

7. An internal line control system, wherein a first telephone supporting an Internet protocol (IP) and capable of being connected to the Internet through a communication mode, comprising: a storage means for storing an IP address of a private branch exchange; and a sending means for sending a switching request to the IP address of the private branch exchange while specifying identification information of an internal line telephone of which switching is requested, accommodated in the private branch exchange;

said private branch exchange supporting an Internet protocol (IP) and connected to the Internet through the communication mode, comprising: a storage means for storing a correlation between the IP address of the first telephone and an internal line number depending upon the identification information; and a transmitting means for transmitting, depending upon the correlation between the IP address and the internal line number, a control signal and a speech communication signal for said internal line telephone to an address specified by the IP address; and the private branch exchange further includes a receiving means for receiving authentication information transmitted with the switching request from the first telephone, and authenticating whether or not the switching request is acceptable depending upon the identification information.

8. An internal line control system, wherein a first telephone supporting an Internet protocol (IP) and capable of being connected to the Internet through a communication mode, comprising: a storage means for storing an IP address of a private branch exchange; and a sending means for sending a switching request to the IP address of the private branch exchange while specifying identification information of an internal line telephone of which switching is requested, accommodated in the private branch exchange;

said private branch exchange supporting an Internet protocol (IP) and connected to the Internet through the communication mode, comprising: a storage means for storing a correlation between the IP address of the first telephone and an internal line number depending upon the identification information; and a transmitting means for transmitting, depending upon the correlation between the IP address and the internal line number, a control signal and a speech communication signal for the internal line telephone to an address specified by the IP address;

an encrypting means for encrypting a control signal and a speech communication signal exchanged between the private branch exchange and the first telephone; and a decrypting means for decrypting the encrypted control signal and speech communication signal.

9. An internal line control system, wherein a first telephone supporting an Internet protocol (IP) and capable of being connected to the Internet through a communication mode, comprising: a storage means for storing an IP address of a private branch exchange; and a sending means for sending a switching request to the IP address of the private branch exchange while specifying identification information of an internal line telephone of which switching is requested, accommodated in the private branch exchange; and said private branch exchange supporting an Internet protocol (IP) and connected to the Internet through the communication mode, comprising: a storage means for storing a correlation between the IP address of the first telephone and an internal line number depending upon the identification information; and a transmitting means for transmitting, depending upon the correlation between the IP address and the internal line number, a control signal and a speech communication signal for the internal line telephone to an address specified by the IP address; and further comprising:

a plurality of the private branch exchanges accommodating at least one of the internal line telephone and the first telephone; wherein the first telephone includes means for specifying identification information of the internal line telephone accommodated in the plurality of private branch exchanges, and requesting switching of the appropriate private branch exchange.

10. An internal line control system, wherein a first telephone supporting an Internet protocol (IP) and capable of being connected to the Internet through a communication mode, comprising: a storage means for storing an IP address of a private branch exchange; and a sending means for sending a switching request to the IP address of the private branch exchange while specifying identification information of an internal line telephone of which switching is requested, accommodated in the private branch exchange;

said private branch exchange supporting an Internet protocol (IP) and connected to the Internet through the communication mode, comprising: a storage means for storing a correlation between the IP address of the first telephone and an internal line number depending upon the identification information; and a transmitting means for transmitting, depending upon the correlation between the IP address and the internal line number, a control signal and a speech communication signal for the internal line telephone to an address specified by the IP address;

said internal line telephone includes posting means for posting a message in that a control is switched over to the first telephone, the private branch exchange posts the switching by the means for posting of the internal line telephone at a time of switching to the first telephone; and a receiving means for receiving authentication information transmitted with the switching request from the first telephone, and authenticating whether or not the switching request is acceptable depending upon the identification information.

11. An internal line control system, wherein a first telephone supporting an Internet protocol (IP) and capable of being connected to the Internet through a communication mode, comprising: a storage means for storing an IP address of a private branch exchange; and a sending means for sending a switching request to the IP address of the private branch exchange while specifying identification information of an internal line telephone of which switching is requested, accommodated in the private branch exchange;

said private branch exchange supporting an Internet protocol (IP) and connected to the Internet through the communication mode, comprising: a storage means for storing a correlation between the IP address of the first telephone and an internal line number depending upon the identification information; and a transmitting means for transmitting, depending upon the correlation between the IP address and the internal line number, a control signal and a speech communication signal for the internal line telephone to an address specified by the IP address;

said internal line telephone includes posting means for posting a message in that a control is switched over to the first telephone, the private branch exchange posts the switching by the means for posting of the internal line telephone at a time of switching to the first telephone;

an encrypting means for encrypting a control signal and a speech communication signal exchanged between the private branch exchange and the first telephone; and a decrypting means for decrypting the encrypted control signal and speech communication signal.

12. An internal line control system, wherein a first telephone supporting an Internet protocol (IP) and capable of being connected to the Internet through a communication mode, comprises:

a storage means for storing an IP address of a private branch exchange; and a sending means for sending a switching request to the IP address of the private branch exchange while specifying identification information of an internal line telephone of which switching is requested, accommodated in the private branch exchange, and said private branch exchange supporting an Internet protocol (IP) and connected to the Internet through the communication mode, comprising:

a storage means for storing a correlation between the IP address of the first telephone and an internal line number depending upon the identification information; and a transmitting means for transmitting, depending upon the correlation between the IP address and the internal line number, a control signal and a speech communication signal for the internal line telephone to an address specified by the IP address;

said internal line telephone includes posting means for posting a message in that a control is switched over to the first telephone, the private branch exchange posts the switching by the means for posting of the internal line telephone at a time of switching to the first telephone;

the private branch exchange further includes a receiving means for receiving authentication information transmitted with the switching request from the first telephone, and authenticating whether or not the switching request is acceptable depending upon the identification information.

13. An internal line control system, wherein a first telephone supporting an Internet protocol (IP) and capable of being connected to the Internet through a communication mode, comprising: a storage means for storing an IP address of a private branch exchange; and a sending means for sending a switching request to the IP address of the private branch exchange while specifying identification information of an internal line telephone of which switching is requested, accommodated in the private branch exchange;

said private branch exchange supporting an Internet protocol (IP) and connected to the Internet through the communication mode, comprising: a storage means for storing a correlation between the IP address of the first telephone and an internal line number depending upon the identification information; and a transmitting means for transmitting, depending upon the correlation between the IP address and the internal line number, a control signal and a speech communication signal for the internal line telephone to an address specified by the IP address;

said internal line telephone includes posting means for posting a message in that a control is switched over to the first telephone, the private branch exchange posts the switching by the means for posting of the internal line telephone at a time of switching to the first telephone; a receiving means for receiving authentication information transmitted with the switching request from the first telephone, and authenticating whether or not the switching request is acceptable depending upon the identification information;

an encrypting means for encrypting a control signal and a speech communication signal exchanged between the private branch exchange and the first telephone; and a decrypting means for decrypting the encrypted control signal and speech communication signal.

14. An internal line control system, wherein a first telephone supporting an Internet protocol (IP) and capable of being connected to the Internet through a communication mode, comprising: a storage means for storing an IP address of a private branch exchange; and a sending means for sending a switching request to the IP address of the private branch exchange while specifying identification information of an internal line telephone of which switching is requested, accommodated in the private branch exchange;

said private branch exchange supporting an Internet protocol (IP) and connected to the Internet through the communication mode, comprising: a storage means for storing a correlation between the IP address of the first telephone and an internal line number depending upon the identification information; and a transmitting means for transmitting, depending upon the correlation between the IP address and the internal line number, a control signal and a speech communication signal for the internal line telephone to an address specified by the IP address;

said internal line telephone includes posting means for posting a message in that a control is switched over to the first telephone, the private branch exchange posts the switching by the means for posting of the internal line telephone at a time of switching to the first telephone;

an encrypting means for encrypting a control signal and a speech communication signal exchanged between the private branch exchange and the first telephone; and a decrypting means for decrypting the encrypted control signal and speech communication signal.

15. An internal line control system, wherein a first telephone supporting an Internet protocol (IP) and capable of being connected to the Internet through a communication mode, comprising: a storage means for storing an IP address of a private branch exchange; and a sending means for sending a switching request to the IP address of the private branch exchange while specifying identification information of an internal line telephone of which switching is requested, accommodated in the private branch exchange;

said private branch exchange supporting an Internet protocol (IP) and connected to the Internet through the communication mode, comprising: a storage means for storing a correlation between the IP address of the first telephone and an internal line number depending upon the identification information; and a transmitting means for transmitting, depending upon the correlation between the IP address and the internal line number, a control signal and a speech communication signal for the internal line telephone to an address specified by the IP address;

a plurality of the private branch exchanges accommodating at least one of the internal line telephone and the first telephone; wherein the first telephone includes means for specifying identification information of the internal line telephone accommodated in the plurality of private branch exchanges, and requesting switching of the appropriate private branch exchange;

wherein IP addresses of the plurality of private branch exchanges are stored in a server on the Internet, and at least one of the first telephone and the internal line telephone obtains from the server the IP address of the private branch exchange when requesting switching.

* * * * *